(12) United States Patent
Hirano et al.

(10) Patent No.: US 6,853,517 B2
(45) Date of Patent: Feb. 8, 2005

(54) ELECTROSTATIC MICROACTUATOR WITH ELECTRICALLY ISOLATED MOVABLE PORTION AND ASSOCIATED DRIVE CIRCUITRY

(75) Inventors: Toshiki Hirano, San Jose, CA (US); Henry Hung Yang, San Jose, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 173 days.

(21) Appl. No.: 10/367,022

(22) Filed: Feb. 13, 2003

(65) Prior Publication Data

US 2004/0160702 A1 Aug. 19, 2004

(51) Int. Cl.[7] .................................................. G11B 5/55
(52) U.S. Cl. .................................................... 360/294.3
(58) Field of Search ............................ 360/294.3–294.6

(56) References Cited

U.S. PATENT DOCUMENTS

| | | | |
|---|---|---|---|
| 4,882,245 A | 11/1989 | Gelorme et al. | |
| 5,025,346 A | 6/1991 | Tang et al. | |
| 5,959,808 A | 9/1999 | Fan et al. | |
| 5,995,334 A | 11/1999 | Fan et al. | |
| 6,190,571 B1 * | 2/2001 | Kato | 216/2 |
| 6,308,573 B1 | 10/2001 | Lee et al. | |
| 6,424,504 B1 | 7/2002 | Abe et al. | |
| 2003/0071541 A1 | 4/2003 | Mita et al. | |
| 2004/0070888 A1 * | 4/2004 | Mastromatteo et al. | 360/294.4 |

OTHER PUBLICATIONS

Hirano et al., "High–bandwidth HDD Tracking Servo by a Moving–slider Micro–actuator", IEEE Transactions on Magnetics, vol. 35, No. 5, pp. 3670–3672, Sep. 1999.
Hirano et al. "HDD Tracking Microactuator and its Integration Issues", ASME International Mechanical Engineering Congress and Exposition, Orlando, FL, pp. 449–452, Nov. 2000.
Fan et al., "Electrostatic Microactuator and Design Considerations for HDD Applications", IEEE Transactions on Magnetics, vol. 35, No. 2, pp. 1000–1005, Mar. 1999.
Micro–Chem Product Brochure, "NANO SU–8 Negative Tone Photoresists Formulations 2–25", Micro–Chem, 1254 Chestnut Street, Newton, MA 02464.

* cited by examiner

Primary Examiner—Allen Heinz
(74) Attorney, Agent, or Firm—Thomas R. Berthold (57) ABSTRACT

A bidirectional electrostatic rotary microactuator has two sets of fixed electrodes, one set for driving the microactuator counterclockwise and the other set for driving it clockwise, and a rotatable frame that has movable electrodes attached to its outer wall and interleaved between the fixed electrodes. A layer of insulating material is located between the outer wall to which the movable electrodes are attached and the remainder of the frame so that the movable electrodes are electrically isolated. The frame is maintained at ground electrical potential and the movable electrodes at a fixed non-zero electrical potential. The microactuator is driven by applying a plus or minus voltage to one set of fixed electrodes and the opposite voltage to the other set, while maintaining the movable electrodes at a fixed non-zero voltage. The microactuator is usable as a secondary actuator in a disk drive for fine positioning the read/write head.

23 Claims, 6 Drawing Sheets

ELECTROSTATIC MICROACTUATOR WITH ELECTRICALLY ISOLATED MOVABLE PORTION AND ASSOCIATED DRIVE CIRCUITRY

TECHNICAL FIELD

This invention relates generally to electrostatic microactuators and more particularly to electrostatic microactuators as secondary read/write actuators in magnetic recording disk drives.

BACKGROUND OF THE INVENTION

Data recording disk drives, such as magnetic recording disk drives, store information in data tracks on the data surface of a rotatable magnetic recording disk. A read/write head or transducer that reads data from and writes data to the data surface is located on an air-bearing slider that is supported by a cushion of air on the rotating disk. The slider is attached to a flexible suspension at the end of a rigid arm and is moved generally radially from track to track by an actuator. The disk drive actuator is typically a rotary voice coil motor (VCM) that moves the actuator arm and the attached suspension and slider generally radially to position the head at the desired track under the control of a servo control system that receives pre-recorded servo position information from the data surface. As the data tracks on the disk are made narrower and placed closer together to increase the data density, it becomes increasingly difficult for the actuator and the servo control system to quickly and accurately position the head over the desired track and to provide track following. For example, a servo control system with a VCM actuator will have difficulty achieving a servo loop bandwidth greater than 2 kHz.

Electrostatic actuators have been proposed for attachment to the suspension to provide a secondary fine positioning of the head while the primary actuator provides the coarse positioning. One such secondary actuator is a rotary electrostatic microactuator (so called because it is a microelectromechanical system (MEMS) device) described in IBM's U.S. Pat. Nos. 5,959,808 and 5,995,334, and in the paper by T. Hirano et al. "HDD TRACKING MICROACTUATOR AND ITS INTEGRATION ISSUES", ASME International Mechanical Engineering Congress and Exposition, Orlando, Fla., pp. 449–452, November 2000. Advances in integrated circuit technology in recent years have led to the development of MEMS devices of micrometer dimensions that can be actuated and controlled using electrostatic and other methods, such as mechanical, electromagnetic, fluidic and thermal. MEMS manufacturing technologies are a combination of the more established semiconductor microfabrication techniques with newer developments in micromachining.

The slider, which supports the read/write head and is attached to the movable portion of the electrostatic microactuator, must always be at ground electrical potential (zero volts) to avoid electrostatic discharge (ESD) between the slider and disk, which would damage the read/write head. Because the microactuator's movable electrodes are electrically grounded, a relatively high voltage (as high as 60V) is needed to generate reasonable force. Also, because the slider ground and the microactuator ground are connected, there can be an electrical coupling between the microactuator driver signal and the magnetic signal from the read/write head, which adds undesirable noise to the magnetic signal.

What is needed is a disk drive electrostatic microactuator and driver circuitry that does not suffer from the disadvantages of microactuator grounding and relatively high voltages.

SUMMARY OF THE INVENTION

The invention is a bidirectional electrostatic rotary microactuator and a disk drive incorporating the microactuator for fine positioning the read/write head. The microactuator has two sets of fixed electrodes, one set for driving the microactuator counterclockwise and the other set for driving it clockwise, and a rotatable frame that has movable electrodes attached to its outer wall and interleaved between the fixed electrodes. A layer of insulating material is located between the outer wall to which the movable electrodes are attached and the remainder of the frame so that the movable electrodes are electrically isolated. The frame is maintained at ground electrical potential and the movable electrodes at a fixed non-zero electrical potential when the disk drive is operating. The microactuator is driven by applying a plus or minus voltage to one set of fixed electrodes and the opposite voltage to the other set, while maintaining the movable electrodes at a fixed non-zero voltage.

For a fuller understanding of the nature and advantages of the present invention, reference should be made to the following detailed description taken together with the accompanying figures.

DETAILED DESCRIPTION OF THE INVENTION

Prior Art

Figure 1:
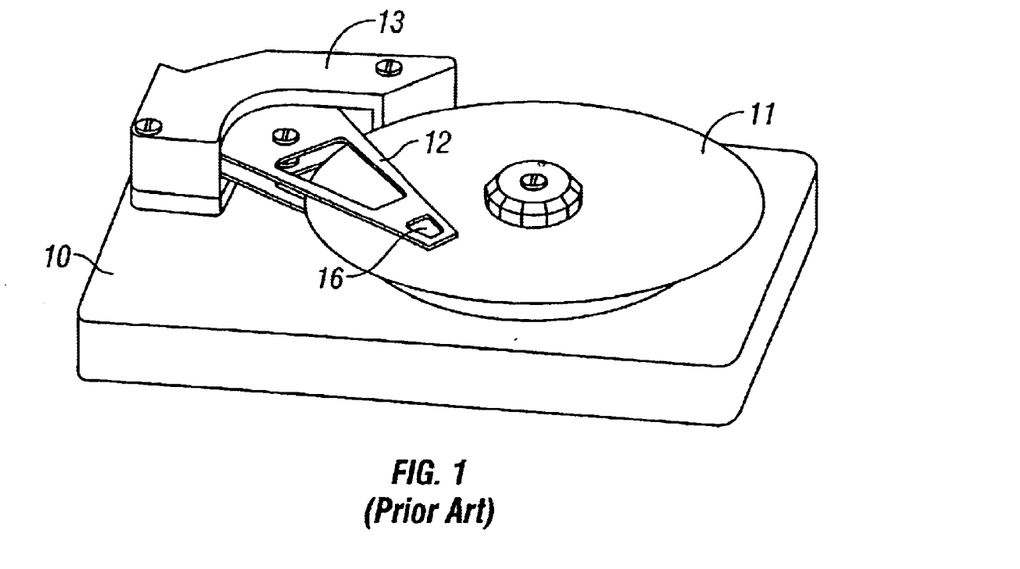
FIG. 1 is a perspective view of a prior art disk drive with a two-stage head positioning system.
Figure 2:
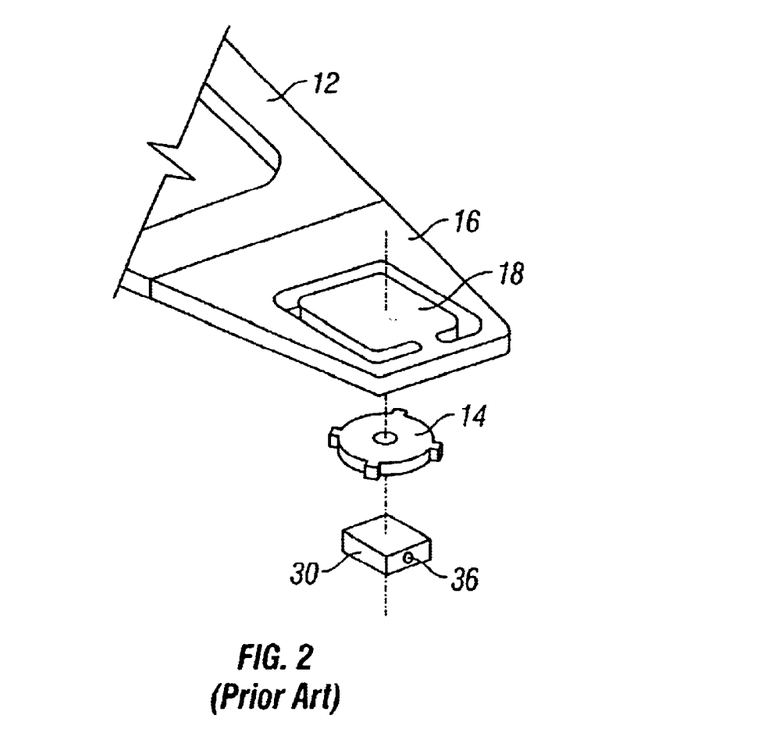
FIG. 2 is a view of the secondary actuator attached to the suspension of the prior art disk drive of FIG. 1.

FIGS. 1 & 2 show a disk drive having a two-stage servo system for positioning a magnetic read/write head 36 attached to a head carrier or slider 30, which may be an air-bearing slider or a contact recording slider, over a selected track on a magnetic recording disk 11. The two-stage servo system includes a voice-coil motor (VCM) primary actuator 13 for coarse positioning the head. The primary actuator 13 and rotatable disk 11 are mounted to the disk drive base 10. The primary actuator 13 includes an actuator arm 12 that has a suspension 16 on its end. The slider 30 is attached to the flexure 18 of suspension 16. The second stage of the two-stage servo system for fine positioning the head 36 over the selected track is a secondary actuator 14 attached to the flexure 18. The secondary actuator 14 supports the slider 30. The enlarged exploded view of FIG. 2 shows the secondary actuator 14, in the form of an electrostatic rotary microactuator, positioned between the flexure 18 and slider 30. The fixed part of the microactuator is bonded the bottom of flexure 18 and the slider 30 is bonded to the movable part of the microactuator. A bonding platform (not shown) may be mounted between the microactuator 14 and the slider 30. The slider 30 may be a continuous contact type of head carrier, such as those having pads or skids that remain in contact with the disk during reading and writing. The slider 30 may also be either the non-contact type that provides a full air-bearing support, or a type that provides only partial support with a portion of the slider being in contact or near-contact with the disk during reading and writing.

Figure 3:
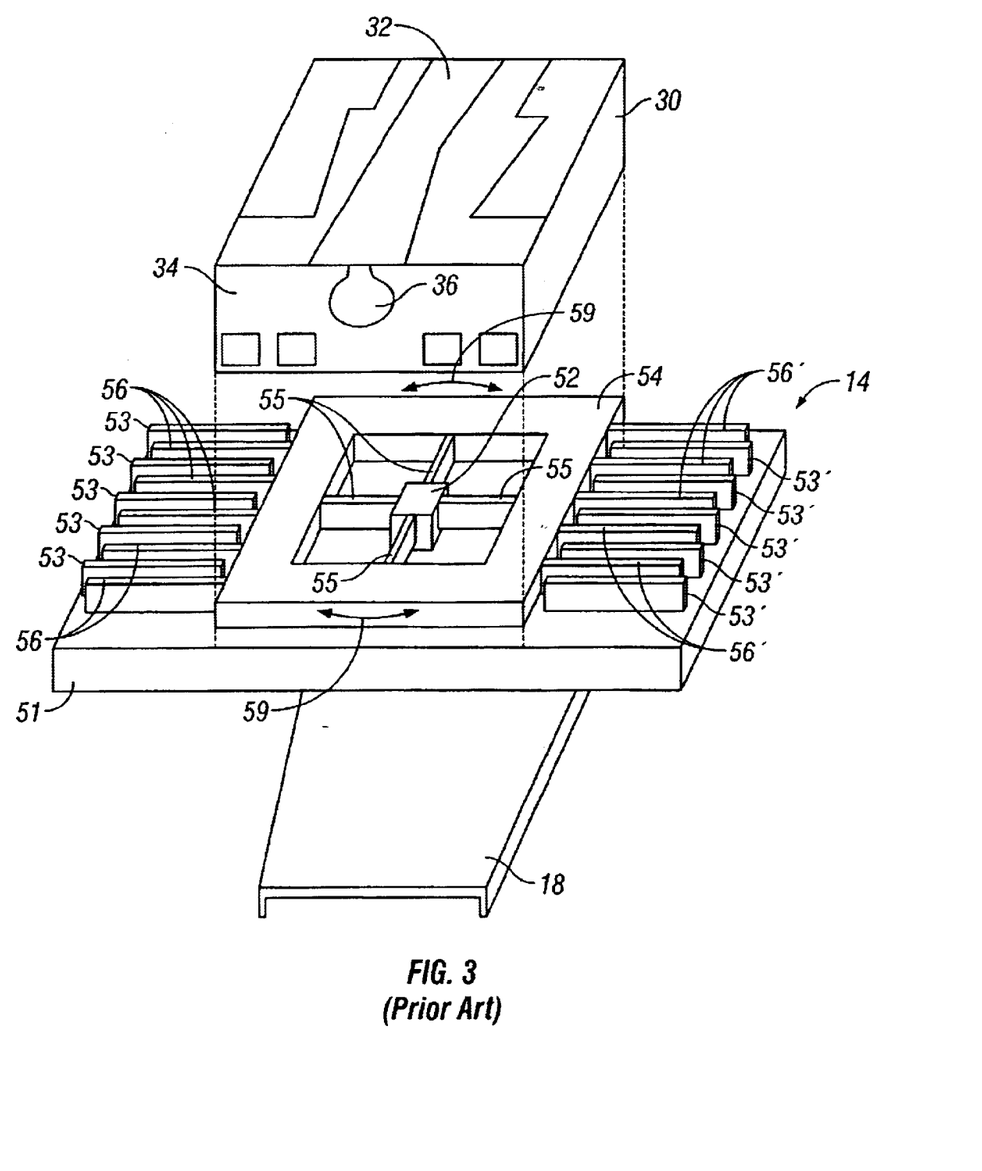
FIG. 3 is an exploded perspective view of a prior art secondary electrostatic microactuator with suspension and slider.
Figure 4:
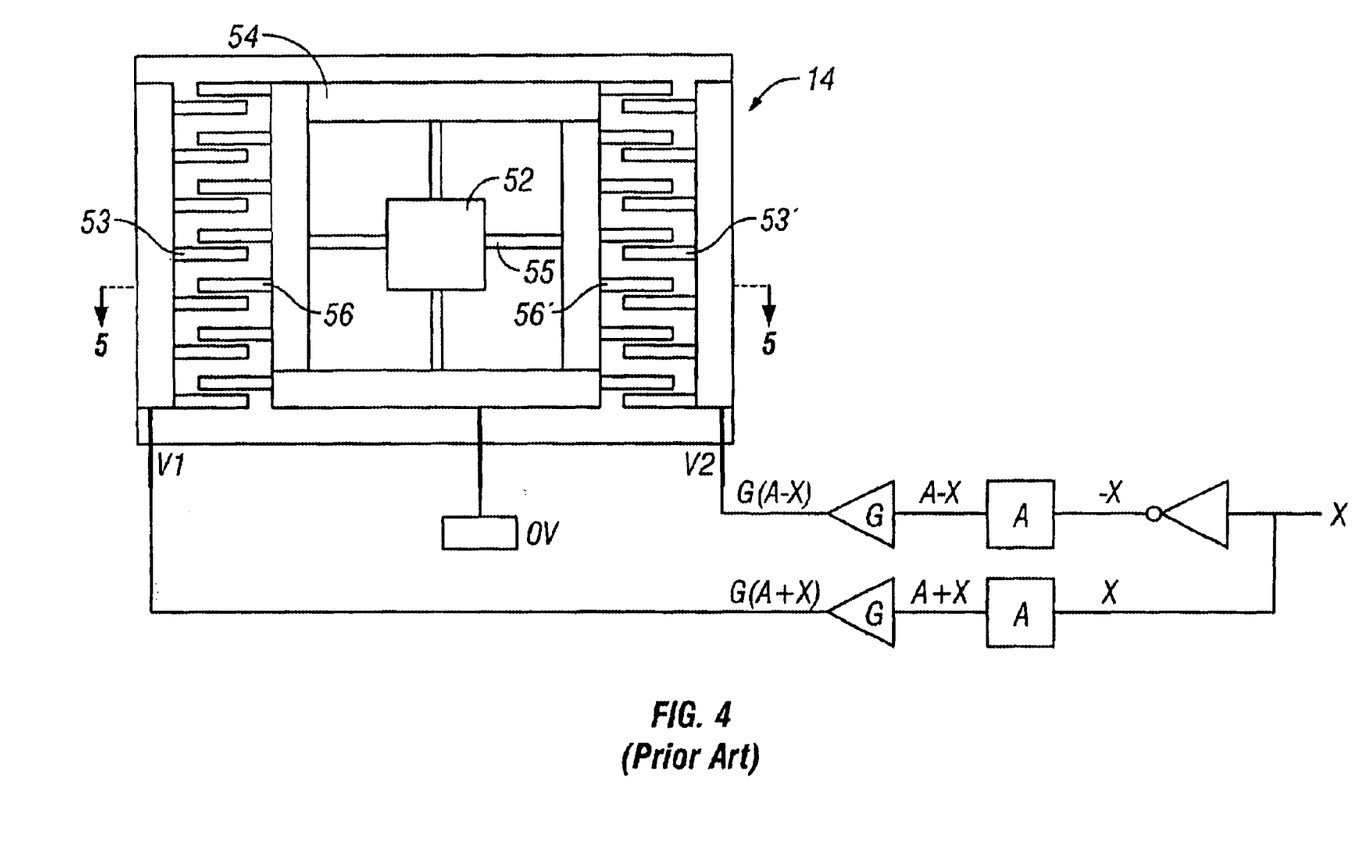
FIG. 4 is a plan view of a prior art electrostatic microactuator with driver circuitry.
Figure 5:
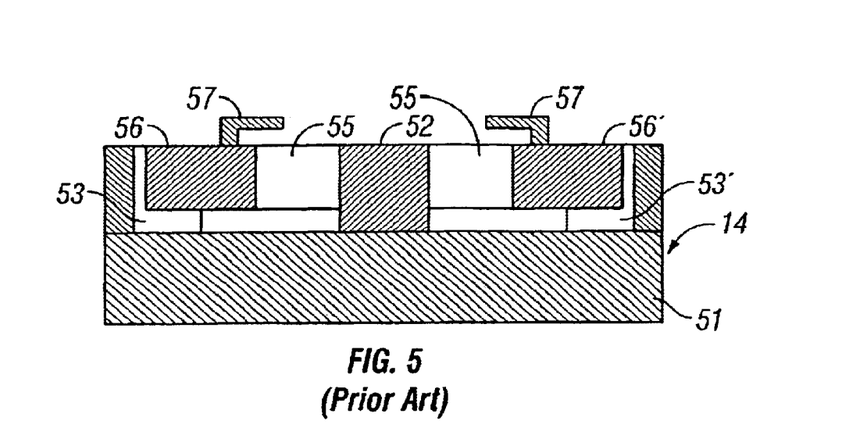
FIG. 5 is a view of a section of FIG. 4 also showing a slider bonding platform.

FIG. 3 is an exploded view of a type of prior art rotary electrostatic microactuator 14, the disk drive suspension flexure 18, and the air-bearing slider 30. FIG. 4 is a plan view of the microactuator 14 with driver circuitry, and FIG. 5 is a view of a section of FIG. 4. The slider 30 has an air-bearing surface 32 that faces the disk of the disk drive and a trailing surface 34 that supports the read/write head 36. The microactuator 14 comprises fixed and movable portions on an insulating substrate 51, which is typically a silicon base with an insulating surface layer, such as a layer of polyimide, silicon oxide or silicon nitride. The substrate 51 is mounted to the flexure 18 on the end of the suspension 16 (FIG. 2). The fixed portion of the microactuator 14 includes a central post 52 fixed to substrate 51 and two sets of stationary electrodes 53, 53' also fixed to substrate 51. The movable rotary portion of the microactuator 14 includes a support frame 54, a plurality of flexible members or springs 55 connecting the frame 54 to the fixed post 52, and a plurality of movable electrodes depicted as two sets 56, 56' attached to frame 54. The sets of movable electrodes 56, 56' are interleaved with the sets of fixed electrodes 53, 53', respectively. The frame 54 may optionally support a platform 57 (FIG. 5) to which the slider 30 is bonded. The platform is shown in sectional view in FIG. 5. All of the elements attached to the substrate 51 are formed by lithographically patterning the substrate 51 and depositing electrically conductive material, such as nickel or copper.

When a force is generated between the movable and stationary electrodes the movable portion of microactuator 14 rotates (as depicted by arrows 59) due to the flexibility of the springs 55. Thus causes the read/write head 36 to move slightly to maintain its position on a data track on the disk. The slider 30 attached to the bonding platform 57 on frame 54 must always be at ground electrical potential (zero volts) to avoid electrostatic discharge (ESD) between the slider 30 and the disk 11 (FIG. 1), which would damage the read/write head 36. To satisfy this requirement, the microactuator 14 is driven by applying a voltage as shown in FIG. 4. The movable portion of the microactuator 14, including the frame 54 and electrodes 56, 56', is connected to ground, and a drive voltage is applied to the stationary electrodes 53, 53'. A non-zero voltage V1 applied to the set of stationary electrodes 53 will apply an electrostatic attractive force between stationary electrodes 53 and movable electrodes 56, tending to cause the frame 54 (and attached slider 30) to rotate counterclockwise. A non-zero voltage V2 applied to the set of stationary electrodes 53' will apply an electrostatic attractive force between stationary electrodes 53' and movable electrodes 56', tending to cause the frame 54 (and attached slider 30) to rotate clockwise. Thus the first set of stationary electrodes 53 are those associated with counterclockwise rotation and the second set of stationary electrodes 53' are those associated with clockwise rotation.

This type of bidirectional electrostatic microactuator is commonly used because electrostatic force can only generate one directional force, i.e., an attractive force. Because the attractive force is proportional to the square of the voltage difference, a positive voltage difference and a negative voltage difference of the same magnitude will generate exactly the same force in the same direction. Because the output force of an electrostatic microactuator is proportional to the square of the voltage difference between the stationary and movable electrodes, it is desirable to linearize the voltage-vs.-force relationship. FIG. 4 shows the common differential driving method. In this method, an analog control voltage x is the input to the system. This voltage is processed in two ways, and applied to the two input terminals of the microactuator. In one path, a fixed bias voltage of A is added, followed by fixed gain amplification G by a high voltage amplifier, resulting in a voltage G*(A+x), which is connected to the microactuator's V1 terminal for the stationary electrodes 53. In another path, the analog input signal x is inverted, and the same fixed bias voltage A is added, and amplified by the same fixed gain G, resulting in a voltage G*(A−x), which is connected to the microactuator's V2 terminal for the stationary electrodes 53'. Since the voltage V1 generates counter-clockwise torque and the voltage V2 generates clockwise torque, the net torque will be the difference of these two torques, which is proportional to $$(G*(A+x))^2-(G*(A-x))^2=4G^2Ax.$$

The result is that the torque is linear to the input control voltage x.

Preferred Embodiments

Figure 6:
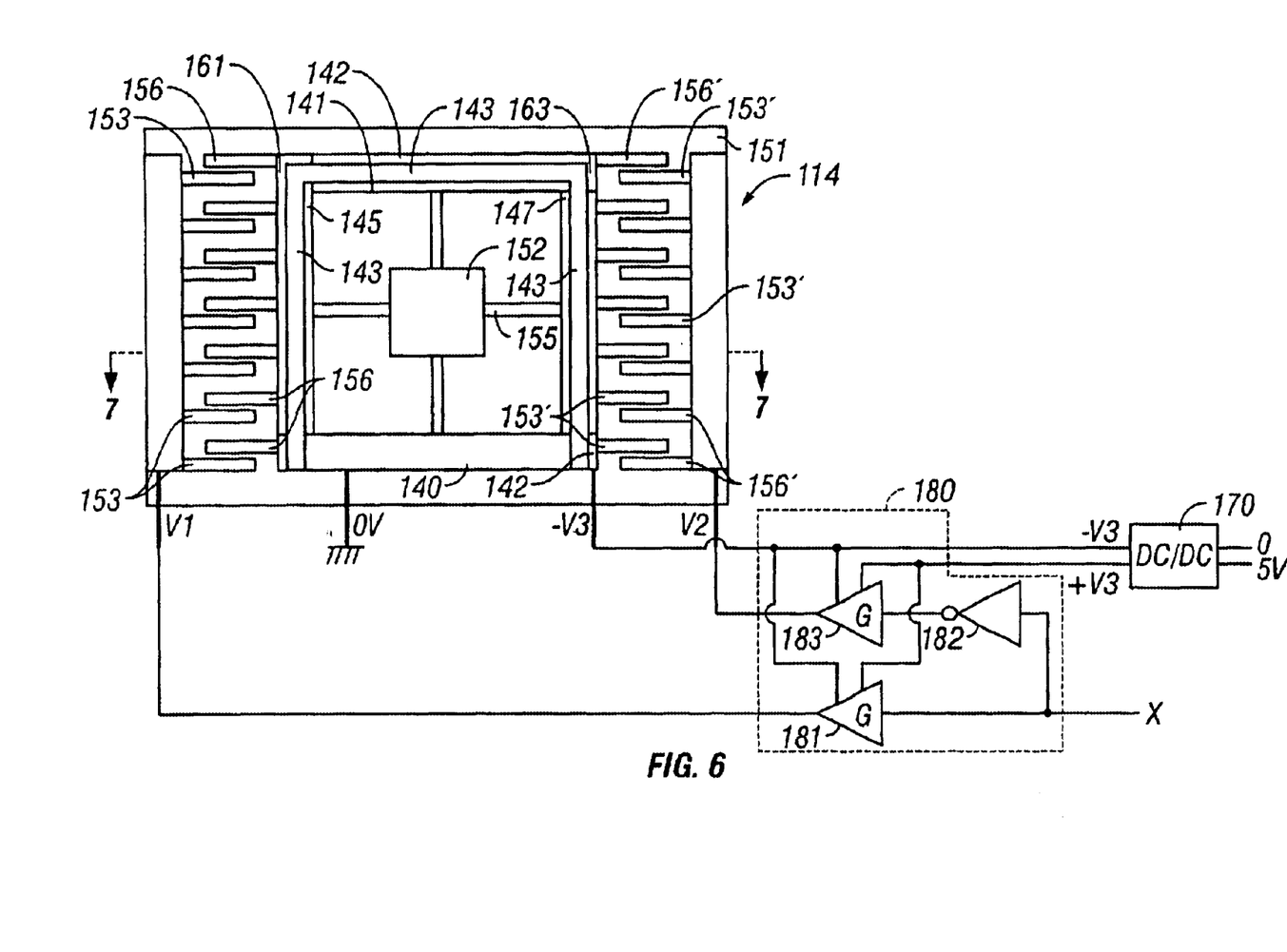
FIG. 6 is a plan view of the electrostatic microactuator with driver circuitry according to the present invention.
Figure 7:
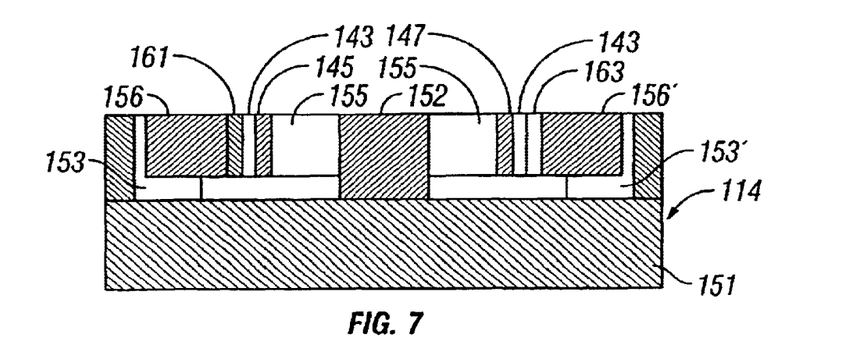
FIG. 7 is a view of a section of FIG. 6 illustrating the electrical isolation between the two movable portions of the microactuator.

FIG. 6 shows the microactuator 114 and its driver circuitry according to the present invention. The microactuator 114 has a movable frame 140 that includes generally rectangularly shaped inner and outer portions 141, 142 formed of electrically conductive material, typically nickel. The two frame portions 141, 142 are connected together but electrically isolated from each other by electrically insulating material 143. The frame 140 has two opposite side walls 145, 147, each of which faces respective sets of spaced apart stationary electrode branches 153, 153', respectively, on the substrate 151. The outer portion 142 of the frame 140 also has side walls 161, 163 that support the sets of spaced apart movable electrode branches 156, 156', respectively. The walls 161, 145 and walls 163, 147 are connected by the insulating material 143. FIG. 7 is a view of a section of FIG. 6 (without the optional bonding platform that would be attached to the inner portion 141 of frame 140) and more clearly shows how the slider is electrically isolated from the movable electrode branches 156, 156'.

While the embodiment shown in FIG. 6 illustrates a bidirectional electrostatic rotary microactuator where the movable frame has a generally rectangular shape with electrode branches extending perpendicularly from the frame walls, the invention is applicable to any bidirectional electrostatic microactuator. For example, the electrode branches do not have to be precisely parallel but can exhibit a slight tilt to increase the packing density on the MEMS device, as shown in FIG. 10 of the T. Hirano et al. paper. Another example is a rotary microactuator that has a generally circularly shaped frame with circularly shaped outer walls that have generally radially extending electrode branches, such as shown as prior art in FIG. 3 of the previously cited '334 patent. It is also known that the movable branch and its associated fixed branches can have a plurality of laterally extending fingers that interleave with each other, as shown in FIG. 13 of the previously cited '334 patent and in FIG. 10 of the T. Hirano et al. paper.

Figure 8:
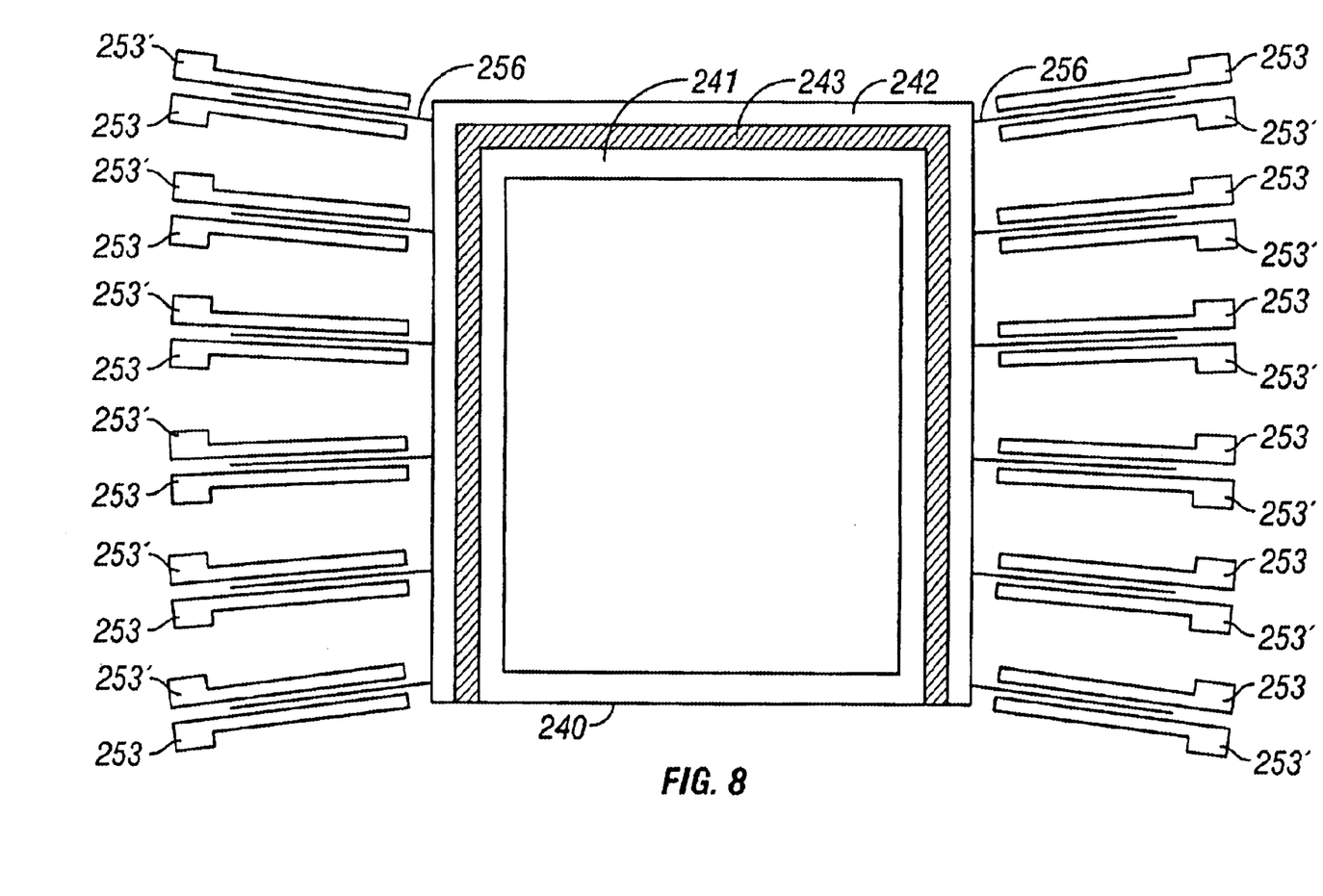
FIG. 8 is a plan view of an embodiment of the electrostatic microactuator of the present invention with one fixed electrode branch from each of the two sets of fixed electrode branches being associated with each movable electrode branch.

The embodiment shown in FIG. 6 is shown for simplicity with each movable electrode branch being associated with only one corresponding fixed electrode branch, so that one set of movable branches 156 is associated with the first set of fixed branches 153 for counterclockwise rotation, and another set of movable branches 156' is associated with the second set of fixed branches 153' for clockwise rotation. However, it is known to have both sets of fixed electrode branches associated with each movable electrode branch, with each movable branch being located between two fixed branches, one from each set, so that each movable branch can generate both clockwise and counterclockwise torque. This embodiment is shown in FIG. 8, wherein the first set of fixed branches 253 provide counterclockwise rotation and the second set of fixed branches 253' provide clockwise rotation. The frame 240 has an inner portion 241 electrically isolated from an outer portion 242 by insulating material 243, with the movable electrodes 256 being attached to outer frame portion 242. One fixed electrode branch 253, 253' from each set is associated with each of the movable electrode branches 256. FIG. 8 also shows the manner in which the movable electrode branches and associated fixed electrode branches can be slightly tilted on the rectangular frame 240.

The fabrication process for microactuator 114 is nearly identical to that used for the prior art microactuators, such as shown in FIGS. 1–5, except for an additional series of steps to form the insulating material 143 that connects the two portions 141, 142. The structure shown in FIG. 6, but without the insulating material, is formed in the conventional manner, with the lithographic pattern modified to define the gap between portions 141, 142 where the insulating material 143 is to be formed. The insulating material 143 can be any dielectric material, such as metal oxides and polymeric materials. The preferred materials are photosensitive polymers, such as polyimide and SU-8.

Thus, in the next step, SU-8 is spin-coated over the structure. SU-8 is a negative, epoxy-type, near-UV photoresist based on EPON SU-8 epoxy resin (from Shell Chemical) that was originally developed by IBM (see U.S. Pat. No. 4,882,245). SU-8 is available from MicroChem Corp in Newton, Mass. This photoresist can be as thick as 2 mm and aspect ratios greater than 20 have been demonstrated with a standard contact lithography equipment. Because SU-8 is a viscous liquid during spin coating, it fills the gap between the two portions 141, 142 that are to be connected. The SU-8 epoxy is then selectively cross-linked by applying UV light. This can be done by a typical photo-mask process. By this step, the SU-8 material between the two portions is cross-linked. SU-8 is developed by its own developer as per manufacturer's specification. This process removes any SU-8 that is not cross-linked, and leaves only cross-linked SU-8, resulting in the SU-8 insulating connection between the two portions 141, 142. The cured SU-8 is highly resistant to solvents, acids and bases and has excellent thermal stability, making it well suited for this application in which the cured structure is a permanent part of the microactuator.

Figure 9:
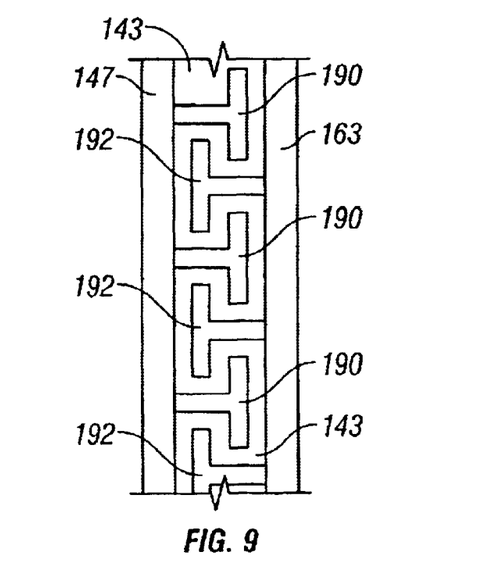
FIG. 9 is a sectional view of a portion of the microactuator according to the present invention illustrating an improved mechanical connection and electrical isolation between the two movable portions.

FIG. 9 shows an improved interconnection between the side walls (such as walls 147, 163) of the frame inner portion 141 and outer portion 142. Each of the walls, such as wall 147 and wall 163, has a plurality of ribs 190, 192, respectively, that extend out and are aligned generally parallel with the walls. The ribs 190, 192 are arranged to interlock with each other but still be out of contact so that the walls are electrically isolated from one another by the insulating material 143. In the embodiment of FIG. 9, the connection surfaces of the two moving portions thus have mutually-engaging zig-zag shapes, which increases the bonding surface area. Also, even if the adhesion force between the two moving portions and the insulating material is not sufficient, it can support in-plane forces very well. The ribs are easily formed by design of the lithographic pattern used for the microactuator over which the electrically conductive material (e.g., nickel) is deposited. Thus this feature doesn't increase the process complexity, because all of the elements on substrate 151 are patterned by a single photolithography step.

FIG. 6 shows the manner in which the electrostatic microactuator is connected to driver circuitry in the disk drive. The inner portion 141 of movable frame 140 is maintained at ground potential (zero Volts). A DC/DC converter 170 converts the +5V disk drive power supply input to a +/−V3 (V3 selected to be 30 Volts in this embodiment) power source which is input to the microactuator driver circuitry 180. The −V3 output line from DC/DC converter 170 line is also connected directly to the outer portion 142 of movable frame 140. Outer frame portion 142 includes the sets of movable electrode branches 156, 156' which are thus maintained at a fixed electrical potential of −30V. The driver circuitry 180 has an input for an analog control signal x. The magnitude and direction of the control signal x is generated by the disk drive servo control system (not shown) to cause the microactuator to rotate in the correct direction and amount so as to maintain the read/write head over the center of the selected data track.

In the present invention, three voltages are applied to the microactuator 114. The analog control voltage x is input to driver circuitry 180 and goes through fixed gain G amplifier 181 which is connected to terminal V1 on the stationary electrode branches 153. Thus a voltage G*x is applied to branches 153. The control voltage x also goes through inverter 182 and then a second amplifier 183 with fixed gain G which is connected to terminal V2 on the stationary electrode branches 153'. Thus a voltage −G*x is applied to branches 153'. The movable electrode branches 156, 156' on the moving portion 142 of the microactuator 114 are connected to the fixed voltage source (voltage −V3). Thus the net torque on the microactuator is proportional to $$(-V3+G^*x)^2 - (-V3-G^*x)^2 = -4^*G^*V3^*x,$$

which is linear to the control input voltage x. The microactuator output is now determined by the difference of two voltages. For example, the output force from the right hand side (electrode branches 153', 156') is determined by V2−(−V3), which is equal to V2+V3, and the output force from the left hand side (electrode branches 153, 156) is determined by V1−(−V3), which is equal to V1+V3. Thus the present invention uses a much lower drive voltage. For example, instead of a 0V to 60V system as in the prior art, a −30V to +30V system is used, which is easier and safer. Since the maximum value of V2 is +30V, and −V3=−30V, the maximum difference between electrode branches 153' and 156' is still 60V, the same as the prior art where 0V and 60V are applied.

An additional advantage of the present invention is that there is no electrical coupling between the signal from driver circuitry 180 and the magnetic signal from the read/write head because of the electrically insulating material 143. Thus the drive signal can not contribute noise to the magnetic signal.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A disk drive comprising:
    a magnetic recording disk having a plurality of data tracks;
    a read/write head for reading data from and writing data to the disk;
    a primary actuator for coarse positioning the head over a selected track; and
    an electrostatic secondary actuator connected to the head and the primary actuator for fine positioning the head over the selected track, the secondary actuator comprising:
        a substrate attached to the primary actuator;
        a plurality of electrically conductive stationary electrodes formed on the substrate; and
        a movable member formed of electrically conductive material and having (a) a frame connected to the substrate and supporting the head, and (b) a plurality of electrically conductive movable electrodes, the frame and supported head being connected to but electrically isolated from the movable electrodes.

2. The disk drive of claim 1 wherein the disk drive includes an air-bearing slider, wherein the read/write head is located on the slider, and wherein the slider is bonded to the frame.

3. The disk drive of claim 1 wherein the primary actuator includes an arm and a suspension attached to the end of the arm, and wherein the substrate of the secondary actuator is attached to the suspension.

4. The disk drive of claim 1 wherein the secondary actuator is a rotary actuator further comprising a post fixed to the substrate, and wherein the frame of the movable member is connected to the post by a plurality of flexible springs, the springs permitting rotation of said frame about said post.

5. The disk drive of claim 1 wherein the movable member of the secondary actuator further comprises (c) a layer of electrically insulating material connecting the movable electrodes to the frame.

6. The disk drive of claim 5 wherein the electrically insulating material comprises a cured photosensitive polymeric material.

7. The disk drive of claim 1 further comprising an electrical device coupled to the movable electrodes for maintaining a fixed non-zero voltage to the movable electrodes when the disk drive is operating.

8. The disk drive of claim 1 wherein the stationary electrodes comprise first and second sets of spaced apart stationary branches, and wherein the movable electrodes comprise spaced apart movable branches interleaved in the spacings between the stationary branches.

9. The disk drive of claim 8 wherein the each movable electrode is interleaved between a stationary electrode of the first set and a stationary electrode of the second set.

10. The disk drive of claim 8 further comprising driver circuitry coupled to the electrostatic actuator, said driver circuitry providing a voltage to the first set of stationary branches in a range between +V and −V volts and a voltage to the second set of stationary branches in a range between +V and −V volts.

11. The disk drive of claim 10 wherein the frame is maintained at ground electrical potential and the movable electrodes at a fixed non-zero electrical potential when the disk drive is operating.

12. The disk drive of claim 11 wherein the movable electrodes are maintained at a fixed non-zero electrical potential of −V volts.

13. The disk drive of claim 12 wherein V is approximately 30 volts.

14. A disk drive comprising:
    a base;
    a rotatable magnetic recording disk mounted to the base and having a plurality of data tracks;
    a read/write head for reading data from and writing data to the disk;
    a head carrier for supporting the head near the surface of the disk;
    a primary rotary actuator mounted to the base;
    an arm having one end attached to the primary rotary actuator;
    an electrostatic secondary rotary actuator attached to the other end of said arm and supporting the head carrier, the secondary rotary actuator comprising (a) a substrate attached to said other end of said arm; (b) first and second sets of spaced apart electrically conductive stationary electrode branches fixed on said substrate; (c) a central post fixed on the substrate; (d) a plurality of flexible spring elements extending laterally from the post; (e) an electrically conductive frame attached to the ends of the spring elements and rotatable about said post, said frame supporting said head carrier and having first and second side walls facing respective first and second sets of stationary branches; (f) electrically insulating material attached to said first and second side walls; and (g) a plurality of electrically conductive movable electrode branches attached to the electrically insulating material on said first side wall and interleaved in the spacings between the stationary branches of the first and second stationary sets; and
    electrical driver circuitry responsive to a control signal and coupled to the secondary rotary actuator for providing a voltage to each of the first and second sets of stationary branches in a range between +V and −V volts and for maintaining the movable branches at a fixed non-zero electrical potential, the electrically conductive frame being maintained at electrical ground potential as a result of its electrical isolation by said electrically insulating material.

15. The disk drive of claim 14 wherein V is approximately 30, and wherein said fixed non-zero electrical potential is approximately −30 volts.

16. The disk drive of claim 14 wherein the electrically insulating material comprises a layer of cured photosensitive polymeric material.

17. The disk drive of claim 14 wherein the head carrier is an air-bearing slider.

18. The disk drive of claim 14 further comprising a bonding platform attached to the frame and supporting the head carrier.

19. The disk drive of claim 14 wherein the movable electrode branches are attached to an outer wall, and wherein the electrically insulating material interconnects said outer wall with said first and second side walls.

20. The disk drive of claim 19 wherein said outer wall and said first and second side walls include extending ribs, wherein the ribs on each side wall are interlocked with the ribs on said outer wall, said interlocking ribs being electrically isolated from each other by the electrically insulating material.

21. A rotary electrostatic microactuator comprising:

a substrate having an electrically insulating surface;

first and second sets of spaced apart electrically conductive fixed electrode branches fixed on said insulating substrate surface;

a central post fixed on said insulating substrate surface;

a plurality of flexible spring elements extending laterally from the post;

an electrically conductive frame attached to the ends of the spring elements and rotatable about said post, said frame having inner and outer walls;

electrically insulating material attached to said inner and outer walls and electrically isolating the inner wall from the outer wall;

a plurality of spaced apart electrically conductive movable electrode branches attached to the outer wall and interleaved in the spacings between the fixed electrode branches; whereby the movable electrode branches are connected to but electrically isolated from the electrically conductive rotatable frame.

22. The microactuator of claim 20 wherein the electrically insulating material comprises a layer of cured photosensitive polymeric material.

23. The microactuator of claim 20 wherein each movable electrode branch is interleaved between a fixed electrode branch of the first set and a fixed electrode branch of the second set.

* * * * *